(12) United States Patent
Aggarwal et al.

(10) Patent No.: US 8,837,599 B2
(45) Date of Patent: Sep. 16, 2014

(54) SYSTEM, METHOD AND APPARATUS FOR CLEAN CHANNEL CHANGE

(75) Inventors: Gaurav Aggarwal, Bangalore (IN); Vijayanand Aralaguppe, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 1714 days.

(21) Appl. No.: 10/957,915

(22) Filed: Oct. 4, 2004

(65) Prior Publication Data

US 2006/0072671 A1 Apr. 6, 2006

(51) Int. Cl.
- *H04N 7/12* (2006.01)
- *H04N 11/02* (2006.01)
- *H04N 11/04* (2006.01)
- *H04N 19/61* (2014.01)
- *H04N 5/50* (2006.01)
- *H04N 7/56* (2006.01)
- *H04N 21/234* (2011.01)
- *H04N 21/43* (2011.01)
- *H04N 21/438* (2011.01)
- *H04N 21/44* (2011.01)

(52) U.S. Cl.
CPC ............... *H04N 7/50* (2013.01); *H04N 5/505* (2013.01); *H04N 7/56* (2013.01); *H04N 21/23406* (2013.01); *H04N 21/23424* (2013.01); *H04N 21/4305* (2013.01); *H04N 21/4384* (2013.01); *H04N 21/44004* (2013.01); *H04N 21/44016* (2013.01)
USPC .................................................. 375/240.25

(58) Field of Classification Search
USPC ........................................ 375/240.01–240.29
See application file for complete search history.

(56) References Cited

U.S. PATENT DOCUMENTS

| 6,118,498 | A | 9/2000 | Reitmeier |
| 6,681,397 | B1 * | 1/2004 | Tsai et al. ................ 725/92 |
| 6,697,428 | B2 * | 2/2004 | Morel ..................... 375/240.03 |
| 6,704,846 | B1 * | 3/2004 | Wu et al. ................... 711/150 |
| 7,027,516 | B2 * | 4/2006 | Anderson et al. ......... 375/240.26 |
| 7,174,085 | B2 * | 2/2007 | Demas et al. .................. 386/68 |
| 2004/0194134 | A1 | 9/2004 | Gunatilake et al. |

FOREIGN PATENT DOCUMENTS

| EP | 0306704 A1 | 3/1989 |
| EP | 1372338 A1 | 12/2003 |
| WO | 03/063507 | 7/2003 |

OTHER PUBLICATIONS

International Search Report, Mar. 31, 2003, PCT/IB 02/05505, 3 pgs.
European Patent Office, Communication with European Search Report, in Application No. 05017396.2, dated Dec. 17, 2010.

* cited by examiner

*Primary Examiner* — Nhon Diep
(74) *Attorney, Agent, or Firm* — Foley & Lardner LLP

(57) ABSTRACT

Presented herein are system(s) and method(s) for clean channel changes. In one embodiment, there is presented a method for changing a channel. The method comprises receiving a portion of a first video bitstream associated with a first channel; receiving a command to switch display from the first channel to a second channel after receiving the portion of the first video; and displaying the portion of the first video bitstream associated with the first channel after receiving the command.

20 Claims, 4 Drawing Sheets

SYSTEM, METHOD AND APPARATUS FOR CLEAN CHANNEL CHANGE

BACKGROUND OF THE INVENTION

Video compression standards, such as MPEG-2 and H.264 (also known as MPEG-4, Part 10, and Advanced Video Coding), allow current cable and satellite television services to provide over 100 channels of television content. Each channel can be associated with video, audio, as well as textual data. The video data and audio data are compressed and encoded as elementary streams. The elementary streams are packetized and multiplexed with elementary streams associated with other channels over a transmission media.

At the decoder, the decoder decodes the elementary streams associated with the channel(s) that the viewer is viewing. When the viewer switches to a new channel, the decoder decodes the elementary streams associated with the channel.

However, there is usually a delay between the time the user switches channels and the time that the decoder provides decoded pictures from the new channel. There are several reasons for this.

One reason for this is that many decoder systems have buffers, queues, and pipelines for decoding the video data. The decoder generally buffers portions of the video elementary stream prior to decoding the portions. Additionally, the decoder decodes portions of the video elementary stream in stages. Each stage simultaneously decodes different portions of the video elementary stream. Decoder systems can also use a queue for providing pictures for display.

When a channel change occurs, the buffer, pipeline, and queue are still filled with portions of the video elementary stream of the previous channel. The decoder system discards the foregoing, and portions of the video elementary stream associated with the new channel proceed through the buffer, pipeline, and queue. There is a time lag for the portions of the video elementary stream associated with the new channel to proceed to display.

Another reason for this delay is that the decoder waits for a sequence header. The video elementary stream comprises at least one video sequence. The video sequence further comprises what are known as sequence headers. The sequence headers include data that the decoder uses for decoding. This data specifies the vertical and horizontal size of the picture, the aspect ratio, pixel sub-sampling format, the picture rate, the use of progressive scan or interlace scan, the profile, level, and bit rate, and quantizing matrices used in intra and inter-coded pictures. The sequencer headers are at certain intervals within the video elementary stream. At the moment of the channel change, the decoder waits until receiving a sequence header from the video elementary stream associated with the new channel.

Another reason for the delay is to achieve time synchronization. The pictures in a video elementary stream include time stamps, indicating when the picture is to be displayed. The decoder uses the time stamps to display the pictures in the correct order, and at the correct times. When the decoder system displays a video elementary stream associated with one channel, the decoder system synchronizes to a time base associated with the video elementary stream. During a channel change, the decoder system synchronizes to a time base associated with another video elementary stream. This adds an additional delay to the time when the user changes the channel to the time the decoder system displays the video from the new channel.

During the time starting from when the user changes the channel and the time that the display provides video from the new channel, the display projects an empty screen. Although this time period is usually short, the viewer often does notice the blank screen. The blank screen becomes more noticeable when the viewer engages in what is known as "channel surfing". During channel surfing, the viewer changes to a channel, quickly glances at what is shown, and proceeds to the next channel, until the viewer selects a channel to watch.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Presented herein are system(s) and method(s) for clean channel changes.

In one embodiment, there is presented a method for changing a channel. The method comprises receiving a portion of a first video bitstream associated with a first channel; receiving a command to switch display from the first channel to a second channel after receiving the portion of the first video; and displaying the portion of the first video bitstream associated with the first channel after receiving the command.

In another embodiment, there is presented a decoder system for video data. The decoder system comprises a pipeline, a receiver, and a display engine. The pipeline receives a portion of a first video bitstream associated with a first channel. The receiver receives a command to switch display from the first channel to a second channel after receiving the portion of the first video. The display engine displays the portion of the first video bitstream associated with the first channel after receiving the command.

These and other advantages, aspects and novel features of the present invention, as well as details of illustrative aspects thereof, will be more fully understood from the following description and drawings.

DETAILED DESCRIPTION OF THE INVENTION

Figure 1:
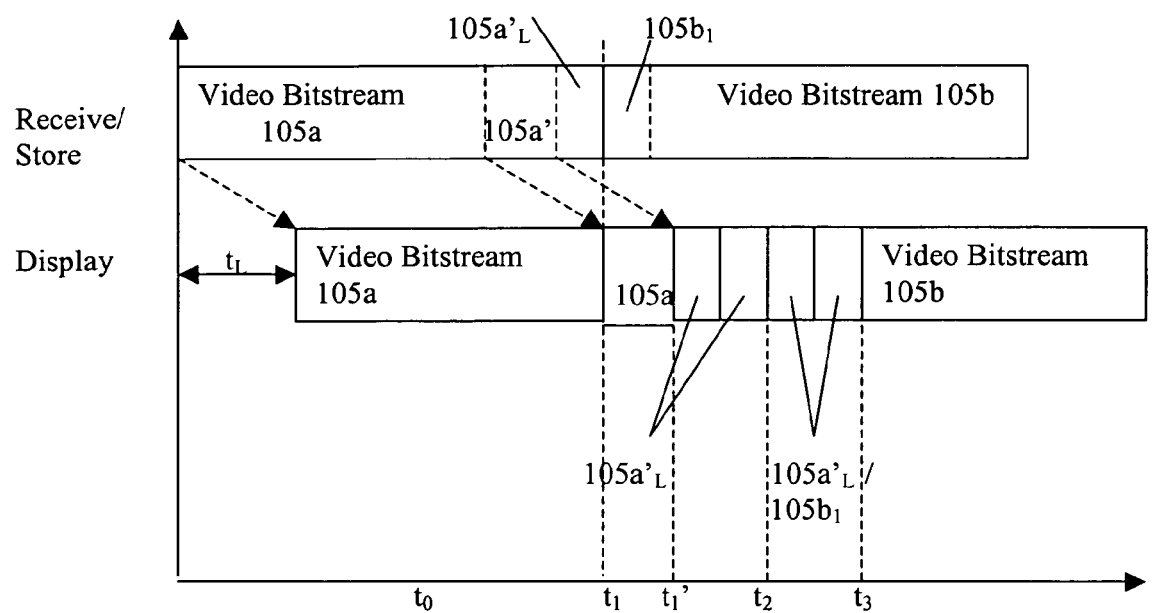
FIG. 1 is a timing diagram describing a channel change in accordance with an embodiment of the present invention.

Referring now to FIG. 1, there is illustrated a timing diagram describing a channel change in accordance with an embodiment of the present invention. At time $t_0$, the viewer is watching a previously selected first channel. During time $t_0$, a first video bitstream 105a associated with the first channel is received, processed, and displayed. There is a time lag $t_L$ between the time portions of the first video bitstream 105a are received and displayed. Additionally, other video bitstreams 105b associated with other channels may also be received. However, the other video bitstreams 105 are not necessarily processed or displayed. For example, in a typical cable set top box, the other video bitstreams 105 may be discarded upon receipt.

At time $t_1$, a user command to switch to a second channel is received. Upon receiving the command, a second video bitstream 105b corresponding to the second channel begins processing. However, as noted above, there is a time lag $t_L$ between the time portions of a video bitstream are received and stored, and the time of display. During the time between $t_1$ and $t_2$, the beginning portion of the second video bitstream 105b is processed. Additionally, during this time, a portion of the first video bitstream 105a' that was stored prior to $t_1$ is displayed.

The time period that the first video bitstream is displayed, $t_1$ to $t_2$, is dictated by the time that is taken to process the second video bitstream 105b. The processing can include, but is not limited to, parsing, decoding, and decompressing the second video bitstream 105b.

If the portion of the first bitstream has already displayed at time $t_{1'}$ prior to the time $t_2$, the last picture 105$a_L$' from the portion of the bitstream is continuously displayed until time $t_2$. At time $t_2$, the beginning portions of the second bitstream are processed.

The portions of the second video bitstream 105b that are processed at $t_2$ may not be in synchronization. The video bitstreams 105 use time stamps to indicate the time that portions of the bitstream 105 should be displayed. The portions of the second video bitstream 105b that are processed may be stale or premature for display. Thus, it is possible that synchronization with the second video bitstream 105b may not occur until time $t_3$.

According to certain aspects of the present invention, the last picture 105$a_L$' is displayed until time $t_3$ Alternatively, the first, or one of the first pictures 105$b_1$' to complete processing from the second video bitstream 105b is displayed from time $t_2$ until synchronization with the second video bitstream 105b at $t_3$. After $t_3$, the second video bitstream 105b is displayed in synchronization.

By way of example, the invention will now be described in the MPEG-2 environment. In MPEG-2, the video bitstreams 105 comprise video elementary streams. It should be understood, however, that the invention is not limited to the MPEG-2 environment.

Figure 2:
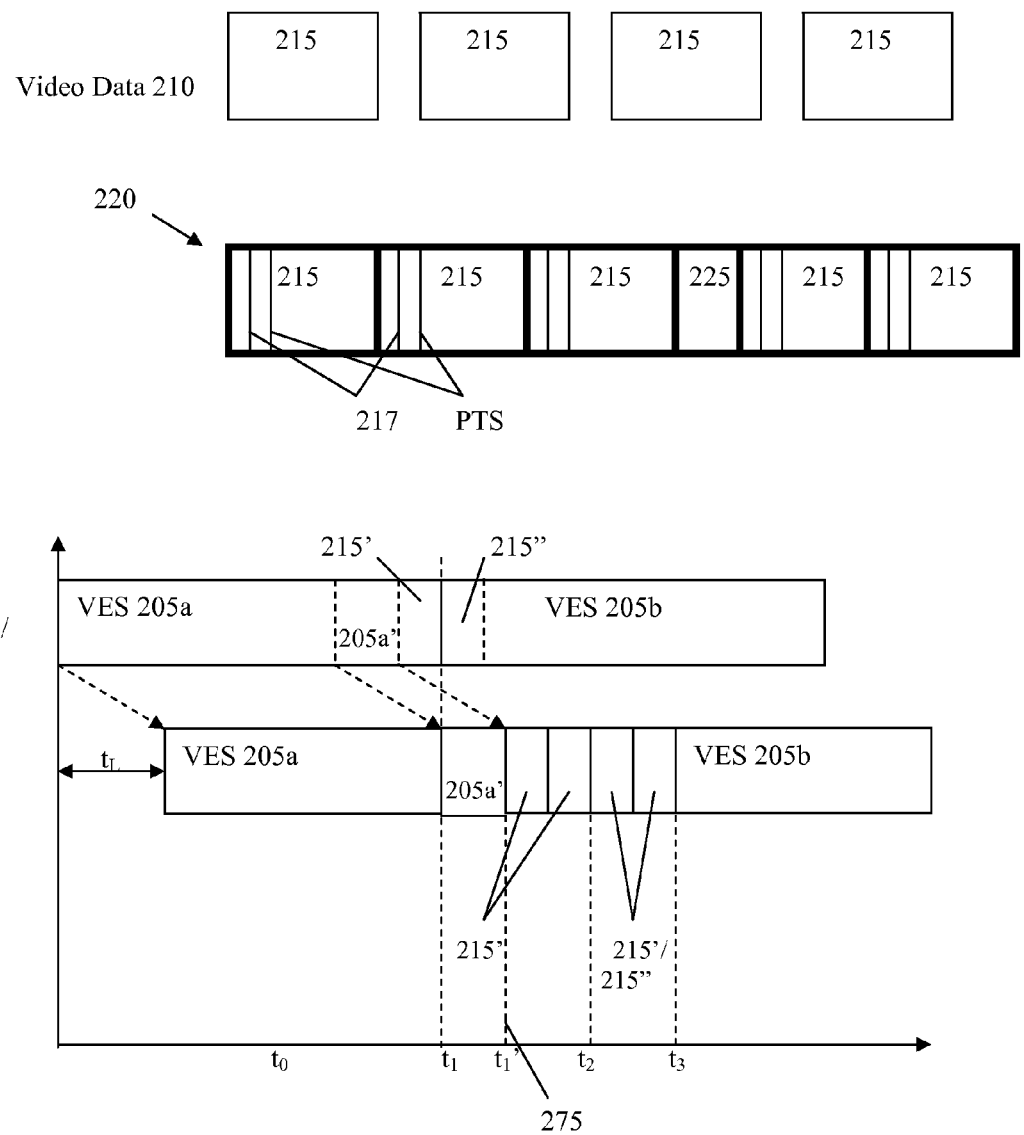
FIG. 2 is a block diagram describing exemplary video elementary streams.

Referring now to FIG. 2, there is illustrated a block diagram of exemplary video elementary streams 205a, 205b. Each video elementary stream 205 encodes a separate video and can be associated with a different channel.

The video elementary streams 205 encode video data 210. Video data 210 comprises a series of pictures 215 capturing a scene at rapid time intervals (such as ⅓₀ or ¹⁄₂₄ second). When the pictures 215 are displayed on a display device, the pictures 215 simulate motion picture.

The video elementary streams 205 comprise video sequences 220 that encode the pictures 215. The video sequences 220 include sequence headers 225. The sequence headers 225 specify the vertical and horizontal size of the picture, the aspect ration, the pixel sub-sampling format, the picture rate, the use of progressive scan or interlace scan, the profile, level, and bit rate, and quantization matrices. A decoder uses the foregoing to decode the video sequence 220. To allow decoding of the video sequence 220 at different entry points, the video sequence 220 includes several sequence headers 225 at different intervals.

The pictures 215 include channel identifiers 217 and Presentation Time Stamps (PTS), and decode time stamps (DTS). The channel identifiers 217 indicate that channel associated with the picture 215. The decode time stamps (DTS) and presentation time stamps (PTS) indicate when the picture 215 is to be decoded and displayed, respectively.

At time $t_0$, the viewer is watching a previously selected first channel. Thus during time $t_0$, a first video elementary stream 205a associated with the first channel is received, processed, and displayed. There is a time lag $t_L$ between the time portions of the first video elementary stream 205a are received and displayed. Additionally, other video elementary streams 205 associated with other channels may also be received. However, the other video elementary streams 205 are not necessarily processed or displayed.

At time $t_1$, a user command to switch to a second channel is received. Upon receiving the command, a second video elementary stream 205b corresponding to the second channel begins processing. However, as noted above, there is a time lag $t_L$ between the time pictures 215 are received and the time of display. During the time between $t_1$ and $t_2$, the beginning pictures 215 of the second video elementary stream 205b are processed. Additionally, during this time, pictures 215 from the first video bitstream 205a that began processing prior to $t_1$ are displayed.

The time period that the first video elementary stream 215 is displayed, $t_1$ to $t_2$, is dictated by the time taken to process the beginning pictures 215 of the second video elementary stream 205b. The processing can include, but is not limited to, parsing, decoding, and decompressing the second video elementary stream 205b.

If at 275, the portion of the first bitstream has already been displayed at time $t_{1'}$ prior to the time $t_2$, the last picture 215' processed from the first video elementary bitstream 205a is continuously displayed until time $t_2$. At time $t_2$ the beginning pictures 215 of the second elementary stream 205b are processed.

The beginning pictures 215 of the second video elementary stream 205b that are processed at $t_2$ may not be in synchronization. Synchronization is based on the presentation time stamp (PTS). The first pictures 215 of the second video elementary stream 215b that are processed may be stale or premature for display. Thus, it is possible that synchronization with the second video elementary stream 205b may not occur until time $t_3$.

According to certain aspects of the present invention, the last picture 215' from the first video elementary stream 205a is displayed until time $t_3$. Alternatively, one of the first pictures 215" to complete processing from the second video elementary stream 205b is displayed from time $t_2$ until synchronization with the second video elementary stream 205b at $t_3$. After $t_3$, the second video elementary stream 205b is displayed in synchronization.

Figure 3:
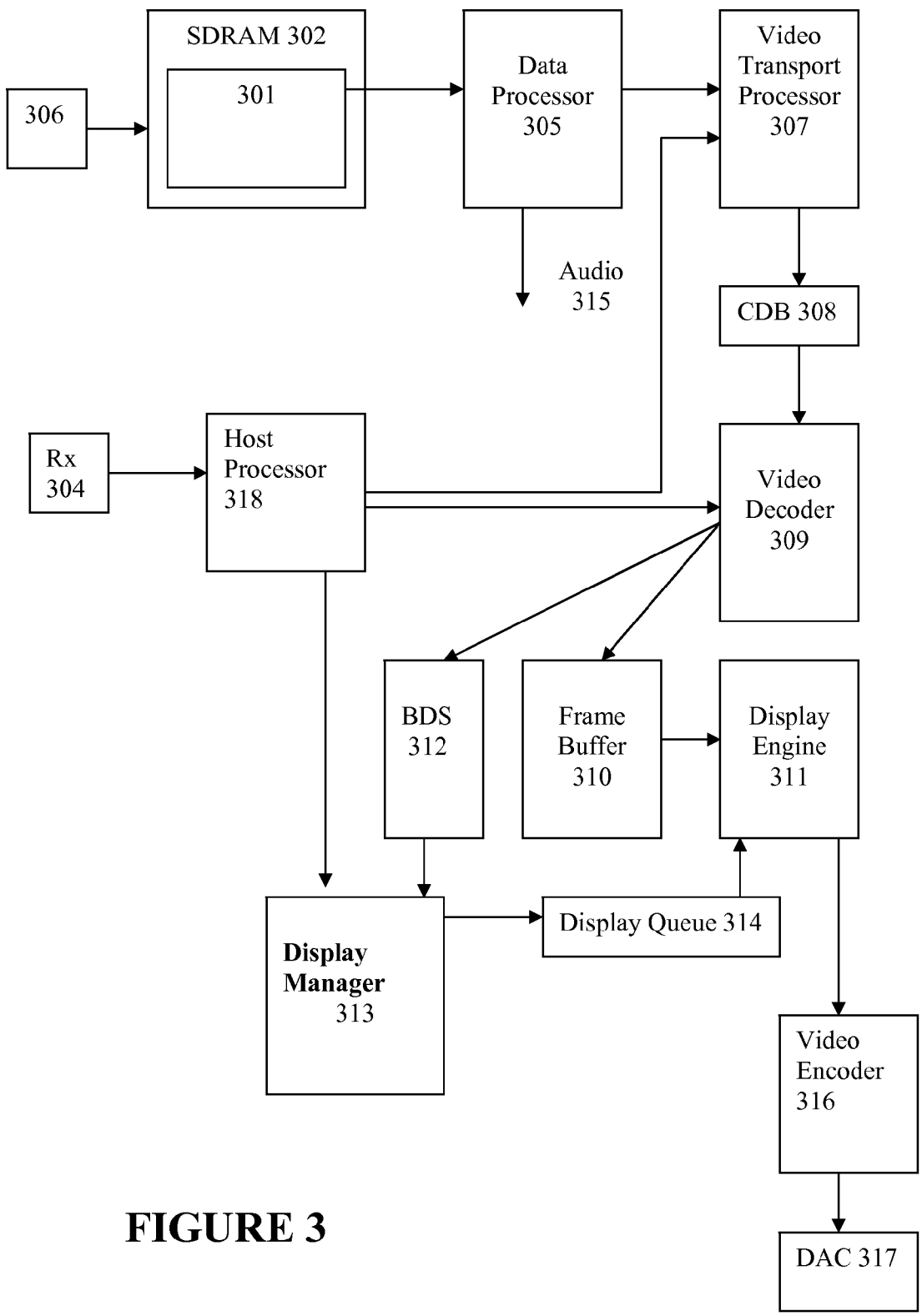
FIG. 3 is a block diagram describing an exemplary video decoder in accordance with an embodiment of the present invention.

Referring now to FIG. 3, there is illustrated a block diagram of an exemplary circuit for decoding the compressed video data, in accordance with an embodiment of the present invention. A presentation buffer 301 within a Synchronous Dynamic Random Access Memory (SDRAM) 302 receives a transport stream. The presentation buffer 301 can receive the transport stream from a communication media 306.

The transport stream provides a number of video elementary streams 205 that are packetized and multiplexed together. Each of the video elementary streams 205 can be associated with a channel. A user can select a channel by transmitting an appropriate signal to a receiver 304. The receiver 304 can comprise, for example, an infrared receiver, a radio receiver, or an input terminal. The receiver 304 provides the signal to a host processor 318.

A data transport processor 305 demultiplexes the transport stream into audio transport streams and video transport streams. The data transport processor 305 provides the audio transport stream to an audio portion 315 and the video transport stream to a video transport processor 307.

The host processor 318 provides a signal to the video transport processor 307 indicating the channel selection of the user. The video transport processor 307 parses the video transport stream and recovers the video elementary streams 205 associated with the selected channel, and writes the video elementary stream to a compressed data buffer 308. The video transport processor 307 discards other video elementary streams.

A video decoder 309 reads the video elementary stream from the compressed data buffer 308 and decodes the video. The video decoder 309 decodes the video on a picture-by-picture basis. When the video decoder 309 decodes a picture, the video decoder 309 writes the picture to a frame buffer 310.

At display time, display engine 311 scales the video picture, renders the graphics, and constructs the complete display. Once the display is ready to be presented, it is passed to a video encoder 316 where it is converted to analog video using an internal digital to analog converter (DAC). The digital audio is converted to analog in an audio digital to analog converter (DAC) 317.

The video decoder 309 also writes a number of parameters associated with each picture in a buffer descriptor structure 312. Each frame buffer 310 is associated with a buffer descriptor structure 312. The buffer descriptor structure 312 associated with a frame buffer 310 stores parameters associated with the picture stored in the frame buffer 310. The parameters can include, for example, presentation time stamps (PTS), and the channel identifier associated with the picture.

A display manager 313 examines the buffer descriptor structures, and on the basis of the information therein, determines the display order for the pictures. The display manager 313 maintains a display queue 314. The display queue 314 includes identifiers identifying the frame buffers 310 storing the pictures to be displayed. The display engine 311 examines the display queue 314 to determine the next picture to be displayed.

The display manager 313 can determine the next picture to be displayed by examining the PTS parameters associated with the pictures. The display manager 313 can compare the PTS values associated with pictures to a system clock reference (SCR) to determine the ordering of the pictures for display.

When the user switches from the first channel to a second channel, the receiver 304 provides a signal to the host processor 318. The host processor 318 sends a signal to the video transport processor 307 and the display manager 313, indicating that the second channel is selected. Responsive to receiving the signal, the video transport processor 307 begins parsing the video elementary stream associated with the second channel.

However, because the video decoder 309 uses sequence headers 225 for decoding, the video transport processor 307 begins writing the video elementary stream associated with the second channel starting from the next sequence header 225.

During the time between the channel change and the time the video transport processor 307 receives the next sequence header 225, the display engine 311 displays pictures from the first video elementary stream. There are time lags between the time that the pictures are received in the compressed data buffer 308, and the time that the video decoder 309 decodes the pictures, and the time that the display engine 311 displays the pictures. Accordingly, at the time of the channel change, the video transport processor 307 will have processed some pictures from the first video elementary stream, and have written those pictures to the compressed data buffer 308.

The video decoder 309 continues to decode those pictures from the first video elementary stream, write the pictures to the frame buffers 310, and write parameters associated with the picture to the buffer descriptor structures 312. The display manager 313 continues to write pictures from the first video elementary stream to the display queue 314.

If the video decoder 309 has finished decoding all of the remaining pictures from the first video elementary stream, prior to the time the video transport processor 307 detects a sequence header for the second video elementary stream, the compressed data buffer 308 will be empty, and the video decoder 309 stops decoding.

The display manager 313 detects that no further information is written to the buffer descriptor structures, suspends time management (comparing the PTS to SCR), and repeats queuing the last picture displayed from the first video elementary stream. This continues until at least the time that the video transport processor 307 detects a sequence header for the second video elementary stream.

When the video transport processor 307 detects a sequencer header from the second video elementary stream, the video transport processor 307 signals the video decoder 309 and the display manager 313, indicating the same. The video transport processor 307 begins writing pictures from the second video elementary stream to the compressed data buffer 308. The video decoder 309 ceases decoding pictures from the first video elementary stream and begins decoding pictures from the second video elementary stream. When the user changes the channel through an application running on the host processor 318, host processor 318 then immediately signals the video decoder 309 to increment an internal counter called the channel identifier counter. Whenever the video decoder 309 decodes a complete picture and hands over the picture properties (sizes, location in frame buffers) to the display engine 311, the video decoder 309 also provides the channel identifier counter value to the display engine 311. The display engine 311 evaluates a picture to determine whether to display it or not. This decision can happen later than the picture decode time due to a queue (FIFO) 314 between the video decoder 309 and display engine 311. If a channel change has happened after a picture is decoded but before the display engine 311 evaluates it then this channel identifier counter value will be smaller than the current channel identifier value. Hence, the display engine 311 figures out that this picture is actually stale, i.e., from an old channel.

When the video decoder 309 begins decoding the pictures from the second video elementary stream, the video decoder 309 writes parameters associated with the pictures from the second video elementary stream to the buffer descriptor structures 308. However, it is possible that there is a further delay between the time that the video decoder 309 decodes the first pictures from the second video elementary stream and the time the decoder system synchronizes to the time base associated with the second video elementary stream.

During this delay, the display manager 313 continues suspending time management. According to some aspects of the invention, the display manager 313 continues queuing the last picture from the first video elementary stream in the display queue 314 for display by the display engine 311. According to other aspects of the invention, the display manager 313 repeatedly queues the first picture decoded from the second video elementary stream in the display queue 314 for display by the display engine 311.

Upon synchronization, the display manager 313 receives a signal from the host processor 318 indicating that the decoder system has synchronized to the time base of the second video elementary stream. Accordingly, the display manager 313 resumes time management and displays pictures from the second video elementary stream.

Figure 4:
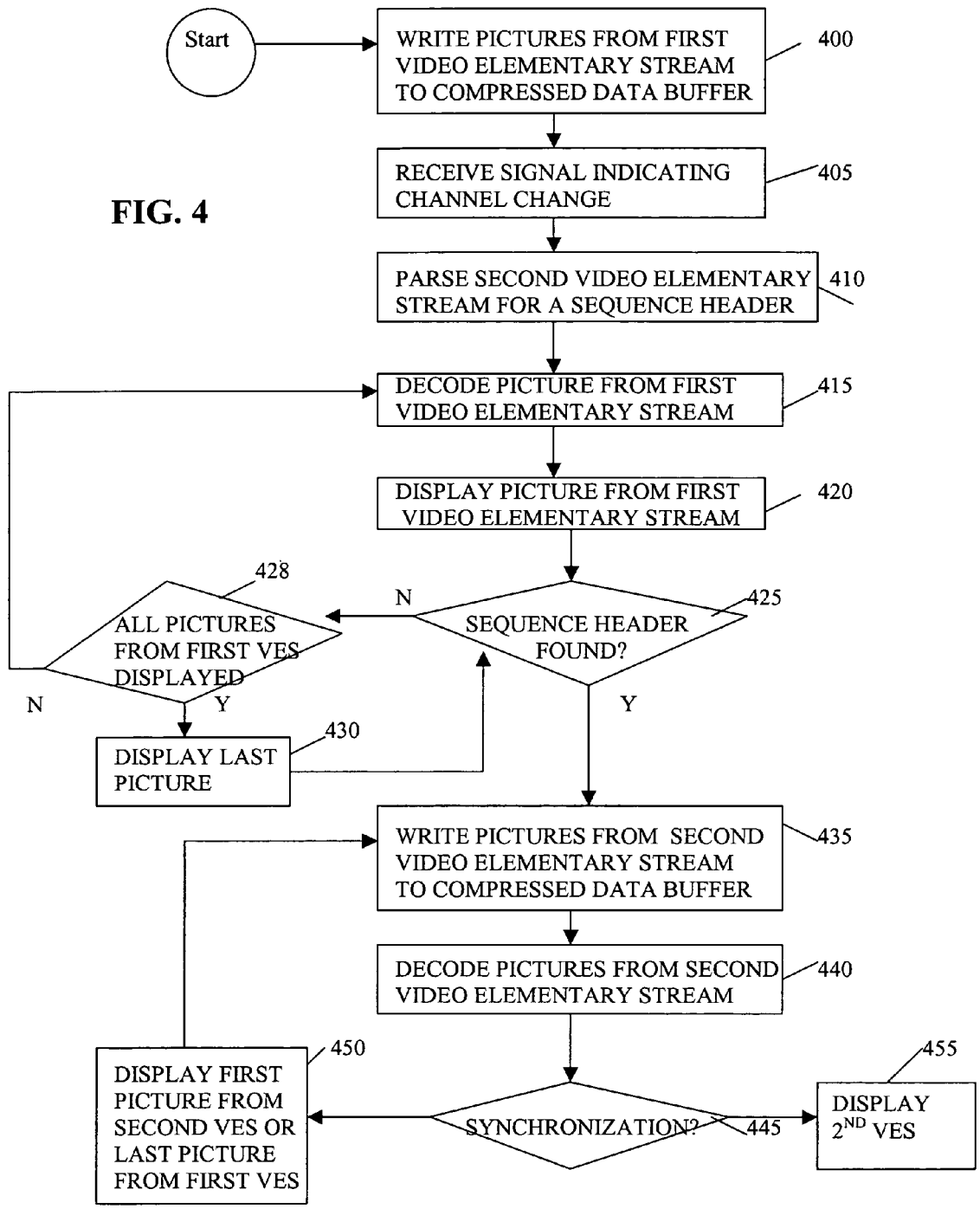
FIG. 4 is a flow diagram describing the operation of the video decoder in accordance with an embodiment of the present invention.

Referring now to FIG. 4, there is illustrated a flow diagram for displaying pictures during a channel change in accordance with an embodiment of the present invention. At 400, the video transport processor 307 writes pictures from a first video elementary stream to the compressed data buffer 308. At 405, the decoder system receives a signal indicating a channel change from the user is received. Responsive thereto, the video transport processor 307 begins parsing (410) the second video elementary stream for a sequence header.

The video decoder 309 decodes (415) a picture from the first video elementary stream, and display manager 313 selects a picture for the display engine to display (420). At 425, a determination is made whether the video transport processor 307 has detected a sequence header for the second video elementary stream.

If at 425, the video transport processor 307 has not found a sequencer header for the second video elementary stream, a determination is made whether all of the pictures from the first video elementary stream that were stored in the compressed data buffer 308 have been displayed at 428. If not, then 415 is repeated. If so, then the display engine 311 displays (430) the last picture from the first video elementary stream.

When the video transport processor 307 detects a sequence header for the second video elementary stream, the video transport processor 307 writes (435) pictures from the second video elementary stream to the compressed buffer 308. At 440, the video decoder 309 decodes pictures from the second video elementary stream. At 445, a determination is made whether the decoder system is synchronized to the time base of the second video elementary stream.

If not, the display manager 313 selects (450) either the last picture from the first video elementary stream or a first decoded picture from the second video elementary stream for display by the display engine 311, and 435 is repeated. If synchronization has occurred during 445, the display engine 311 displays (455) pictures from the second video elementary stream according to the PTS.

The degree of integration of the system will primarily be determined by speed and cost considerations. Because of the sophisticated nature of modern processor, it is possible to utilize a commercially available processor, which may be implemented external to an ASIC implementation. If the processor is available as an ASIC core or logic block, then the commercially available processor can be implemented as part of an ASIC device wherein certain functions can be implemented in firmware. In one embodiment, the foregoing can be integrated into a single integrated circuit. Additionally, the functions can be implemented as hardware accelerator units controlled by the processor.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope.

Therefore, it is intended that the present invention not be limited to the particular embodiment disclosed, but that the present invention will include all embodiments falling within the scope of the appended claims.

The invention claimed is:

1. A method for changing a channel, said method comprising:
   storing a portion of a first video bitstream associated with a first channel, the stored portion of the first video bitstream comprising a plurality of moving pictures;
   receiving a command to switch display from the first channel to a second channel after receiving the portion of the first video; decoding the portion of the first video bitstream;
   providing for display the stored portion of the first video bitstream associated with the first channel after receiving the command to switch display from the first channel to the second channel, where the plurality of moving pictures associated with the first video bitstream are provided for display without reducing quality of the plurality of moving pictures; and
   providing pictures from the second channel for display after the plurality of moving pictures without reducing a specified quality of the pictures from the second channel provided in a sequence header.

2. The method of claim 1, wherein displaying the stored portion of the first video bitstream further comprises:
   providing for display a picture from the stored portion of the first video bitstream for more than one video display period.

3. The method of claim 2, wherein providing for display the picture from the stored portion of the first video bitstream further comprises:
   providing for display the picture from the stored portion of the first video bitstream at least until the sequence header is received in a second video bitstream associated with the second channel.

4. The method of claim 3, wherein providing for display pictures from the second channel further comprises:
   providing for display the second video bitstream after receiving the sequence header.

5. The method of claim 4, further comprising:
   synchronizing to a time base associated with the second video bitstream;
   wherein providing for display the second video bitstream further comprises:
      providing for display a particular picture from the second video bitstream until synchronizing to the time base.

6. The method of claim 3, further comprising:
   synchronizing to a time base associated with the second video bitstream;
   wherein providing for display the picture from the stored portion of the first video bitstream further comprises:
      providing for display the picture from the stored portion of the first video bitstream at least until synchronizing to the time base.

7. The method of claim 6, further comprising:
   providing for display the second video bitstream after synchronizing to the time base.

8. The method of claim 7, further comprising:
   incrementing a counter in response to receiving the command to switch display from the first channel to the second channel.

9. A decoder system for display pictures, said decoder system comprising:
   a buffer for storing a portion of a first video bitstream associated with a first channel, the stored portion of the first video bitstream comprising a plurality of moving pictures;

a receiver for receiving a command to switch display from the first channel to a second channel after receiving the stored portion of the first video; decoding the portion of the first video bitstream; and a display engine for providing for display at least some of the stored portion of the first video bitstream associated with the first channel after receiving the command to switch display from the first channel to the second channel, where moving pictures of the plurality of moving pictures associated with the first channel for display, are provided for display without reducing quality of the moving pictures that are provided, and providing for display pictures from the second channel after the at least some of the stored portion of the first video bitstream, where the pictures from the second channel are provided for display without reducing picture quality based on a sequence header associated with the pictures from the second channel.

10. The decoder system of claim 9, wherein providing for display the at least some of the stored portion of the first video bitstream further comprises providing for display a picture from the stored portion of the first video bitstream for more than one video display period.

11. The decoder system of claim 10, wherein providing for display the picture from the stored portion of the first video bitstream further comprises providing for display the picture from the stored portion of the first video bitstream at least until the sequence header is received in a second video bitstream associated with the second channel.

12. The decoder system of claim 11, wherein providing for display pictures from the second channel further comprises providing for display the second video bitstream after receiving the sequence header.

13. The decoder system of claim 12, further comprising:
a display manager for synchronizing to a time base associated with the second video bitstream.

14. The decoder system of claim 13 wherein providing for display the second video bitstream further comprises providing for display a particular picture from the second video bitstream until synchronizing to the time base.

15. The decoder system of claim 13, wherein providing for display the picture from the first video bitstream further comprises providing for display the picture from the first video bitstream at least until synchronizing to the time base.

16. The decoder system of claim 15, wherein the display engine provides for display the second video bitstream after synchronizing to the time base.

17. The decoder system of claim 9, wherein the video decoder is configured to increase a counter in response to the command to switch display from the first channel to the second channel.

18. The decoder system of claim 17, wherein the video decoder provides a decoded picture associated with the first or second channels and a channel identifier based on the counter to the display engine, which determines whether the decoded picture is associated with the first channel or the second channel based on the channel identifier.

19. A decoder system for display pictures, said decoder system comprising:
a buffer for storing a portion of a first video bitstream associated with a first channel, said stored portion of the first video bitstream comprising a stream of sequential pictures, and wherein the stream of sequential pictures further comprises a first picture, a second picture, and a last picture;

a receiver for receiving a command to switch display from the first channel to a second channel after receiving the portion of the first video bitstream; decoding the portion of the first video bitstream; and a display engine for providing for display at least some of the stored portion of the first video bitstream associated with the first channel after receiving the command, and providing for display pictures from the second channel after the at least some of the stored portion of the first video bitstream, where the pictured from the second channel are provided for display without reducing picture quality of the pictures from the second channel based on a sequence header associated with the pictures from the second channel, wherein providing for display the at least some of the stored portion of the first video bitstream further comprises:
providing for display in sequence, pictures starting with the first picture and then the second picture until either a second bitstream associated with the second channel is ready for provision for display or the last picture is displayed, without reducing quality of the pictures of the portion of the first video bitstream;

wherein if the last picture is displayed before the second channel is ready for display, displaying the last picture until the second bitstream associated with the second channel is ready for display.

20. The method of claim 1, wherein the first video bitstream associated with the first channel and a second video bitstream associated with the second channel are decoded by a common video decoder.

* * * * *